United States Patent [19] [11] 4,088,421
Hoeft [45] May 9, 1978

[54] COVERPLATE DAMPING ARRANGEMENT
[75] Inventor: Robert F. Hoeft, Schenectady, N.Y.
[73] Assignee: General Electric Company, Schenectady, N.Y.
[21] Appl. No.: 728,295
[22] Filed: Sep. 30, 1976
[51] Int. Cl.² ............................................. F01D 5/10
[52] U.S. Cl. .............................. 416/193 A; 416/145; 416/500
[58] Field of Search .................. 416/193 A, 145, 220, 416/500

[56] References Cited
U.S. PATENT DOCUMENTS

| | | | |
|---|---|---|---|
| 2,937,849 | 5/1960 | Danforth | 416/220 X |
| 3,112,915 | 12/1963 | Morris | 416/193 A X |
| 3,137,478 | 6/1964 | Farrell | 416/220 |
| 3,181,835 | 5/1965 | Davis | 416/145 |
| 3,266,770 | 8/1966 | Harlow | 416/220 |
| 3,610,778 | 10/1971 | Suter | 416/193 A X |
| 3,709,631 | 1/1973 | Karstensen et al. | 416/220 X |
| 3,751,183 | 8/1973 | Nichols et al. | 416/220 |
| 3,887,298 | 6/1975 | Hess et al. | 416/220 |
| 3,936,222 | 2/1976 | Asplund et al. | 416/193 A X |

FOREIGN PATENT DOCUMENTS 1,259,750  1/1972  United Kingdom ............ 416/193 A Primary Examiner—Everette A. Powell, Jr.
Attorney, Agent, or Firm—Jerome C. Squillaro

[57] ABSTRACT

A coverplate damping arrangement is provided for a turbine assembly wherein a sealing and damping pin which extends between and under adjacent bucket platforms is formed with one or more eccentric masses which cause the pin, under the urging of centrifugal force, to rotate into abutment with the coverplate.

5 Claims, 5 Drawing Figures

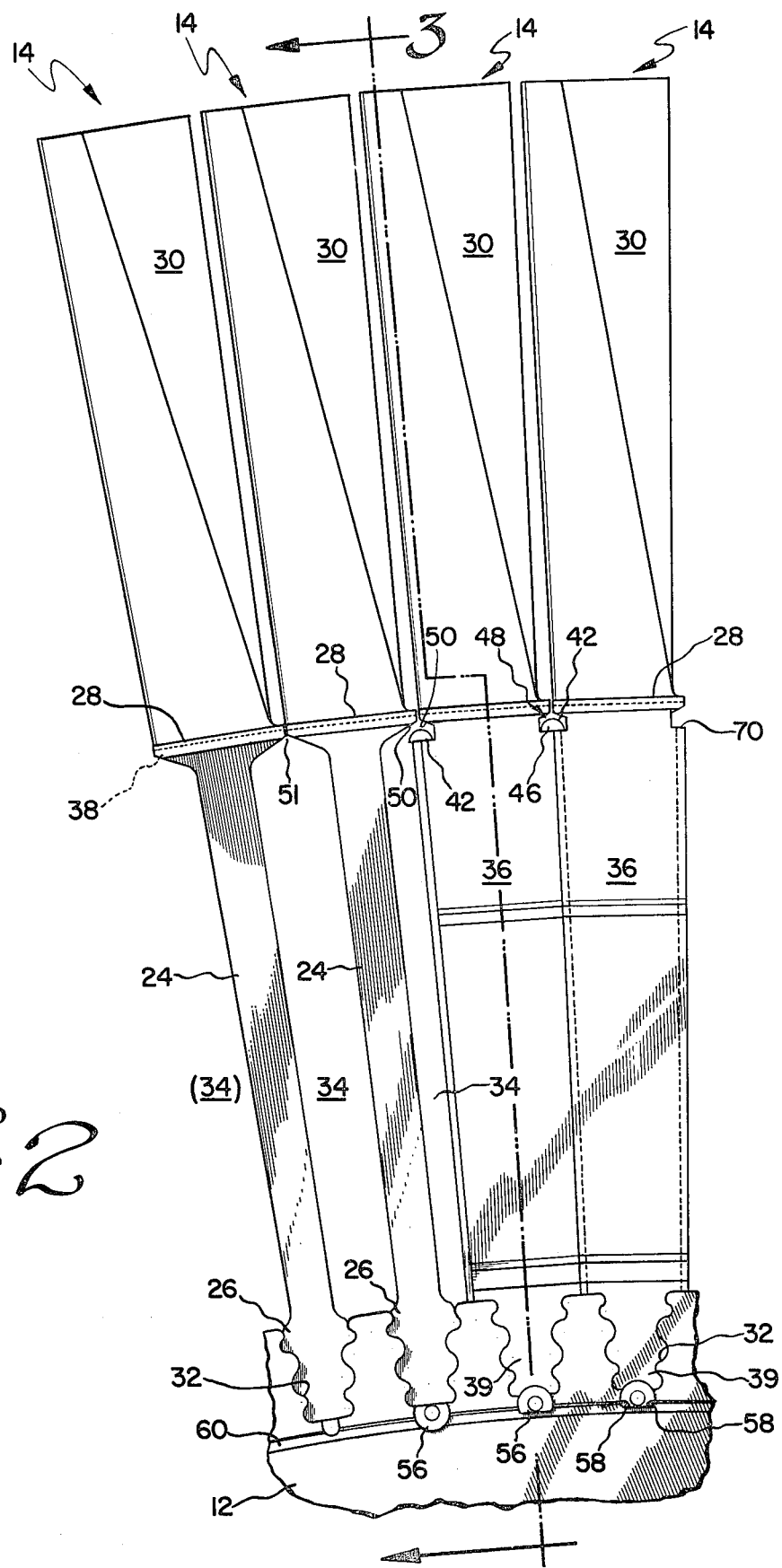

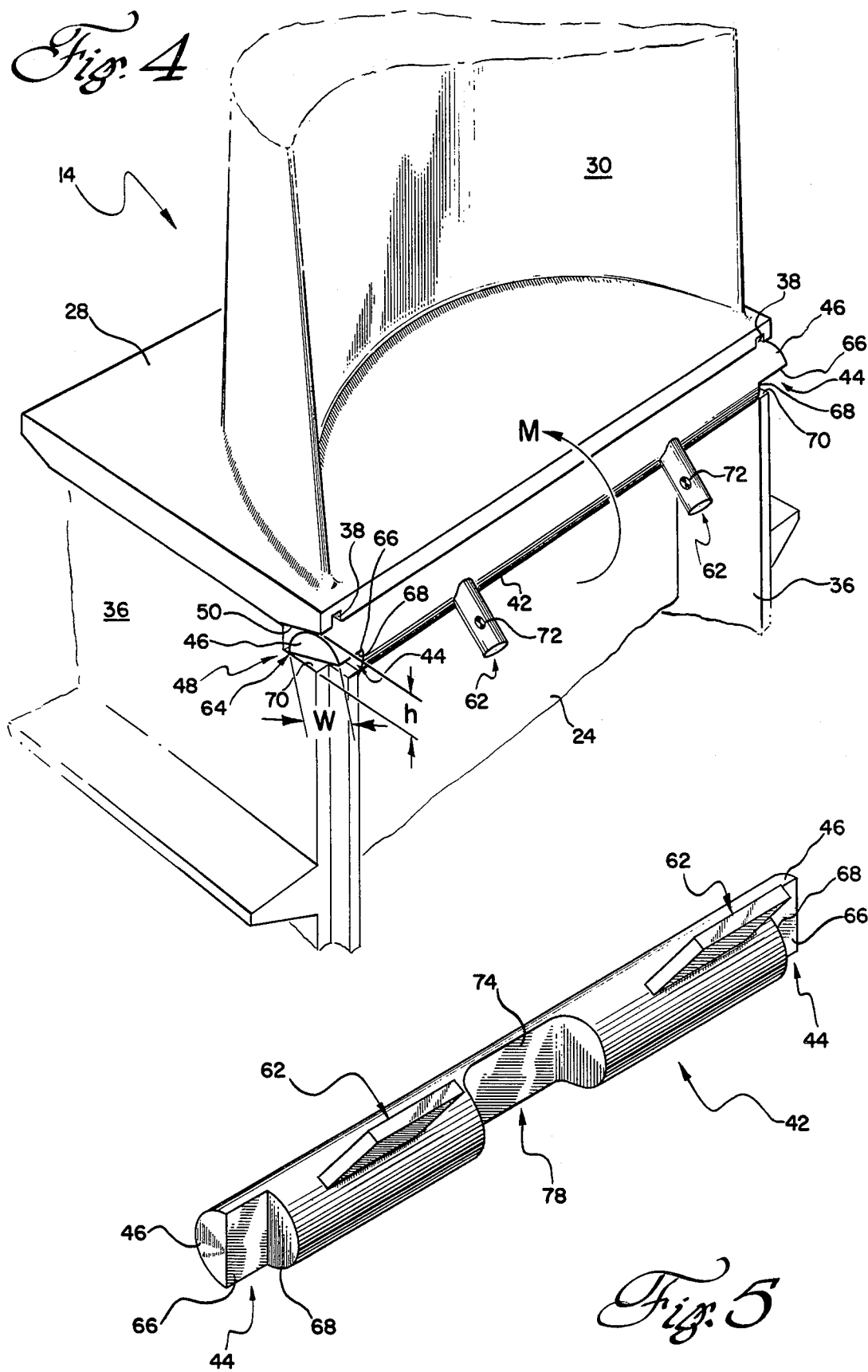

COVERPLATE DAMPING ARRANGEMENT

This invention relates to an improved turbine assembly, and more particularly to an arrangement for damping the coverplates of a turbine assembly.

BACKGROUND OF THE INVENTION

Gas turbine buckets are often formed with a long, relatively thin shank which extends radially between the platform portion of the bucket and the dovetail base or root portion of the bucket. These shanks permit the use of a smaller diameter turbine wheel and attachment of the bucket dovetail base to the turbine wheel at a location of lower temperature. With such bucket construction, segmented coverplates are often employed on each axial side of the shanks to reduce gas flow leakage in the axial direction between the adjacent bucket shanks. Such coverplates are generally thin in axial thickness and may be attached to the turbine wheel at their radial inner ends and engage circumferentially extending clearance slots formed in the radially inner side of the bucket platforms. The turbine assembly usually includes an annular pin which seals the gap between adjacent bucket platforms and provides damping for the buckets. The pins are formed with notched ends and extend axially under the bucket platforms and are supported at each end by engagement of their notched ends with cutouts formed in the coverplates. A turbine assembly as generally described above is more fully shown in U.S. Pat. No. 3,137,478, issued June 16, 1964 and assigned to the assignee hereof. In such turbine assemblies, design considerations necessitate that the outer radial end of the thin coverplates remain in clearance with the bucket platform. Thus, even though the outer radial ends of the coverplates may extend into a platform slot or groove, they are free to vibrate. It has been found that the coverplates of such an arrangement may be susceptable to vibration and high cycle fatigue failure.

Accordingly a primary object of the present invention is to provide an arrangement for damping the outer radial ends of the coverplates of turbine assemblies or holding such ends against vibration.

A further object of the present invention is to provide a damping pin which will block leakage flow between adjacent bucket platforms and will be urged into frictional abutment with a coverplate by centrifugal force and damp coverplate vibration through the mechanism of heat producing relative slip or simply restrain the outer radial end of the coverplate so as to prevent vibration.

SUMMARY OF THE INVENTION

Briefly stated, the present invention provides means for damping vibration in the coverplates of a turbine assembly and includes a pin that extends between axially spaced pairs of coverplates and frictionally abuts an outer radial edge of such coverplates so that vibration in such coverplates will be damped through the mechanism of heat producing relative slip or, for some vibrational modes, by simply restraining the outer radial edge. The pin is formed with at least one eccentric mass, the center of gravity of which is displaced from the axial centerline of the pin. The pin is loosely supported at each axial end thereof by engagement of notched ends of the pin with support openings cooperatively formed by the coverplates and the platforms of the turbine buckets. Each pin extends axially between a pair of circumferentially adjacent turbine buckets in a position closely spaced to and underlying the interface of the platform portions of such circumferentially adjacent buckets, with the eccentric mass oriented such that when the turbine assembly or turbine wheel is rotated, the pin will be rotated by the eccentric mass or the centrifugal moment produced thereby into frictional abutment with at least one coverplate and will also centrifugally abut the bucket platforms so as to block fluid leakage flow at the interface of the bucket platforms. In one form the pin may include two eccentric masses and an area of reduced cross-section therebetween that permits one end of the pin to twist relative to the other end under the urging of the centrifugally produced moment so as to provide frictional abutment of each end of the pin with a coverplate while allowing for dimensional stackup variations between such coverplates.

BRIEF DESCRIPTION OF THE DRAWINGS

While the specification concludes with claims particularly pointing out and distinctly claiming the subject matter of this invention, it is believed that the invention will be better understood upon reading the following description of the invention in conjunction with the accompanying drawings wherein:

FIG. 2 is a fragmentary view, with portions removed, which it taken along lines 2—2 of FIG. 1 and drawn to an enlarged scale;

FIG. 4 is an enlarged perspective view showing a portion of the improved turbine assembly of this invention; and FIG. 5 is a view showing an alternative construction for the damping and seal pin of this invention.

DESCRIPTION OF THE INVENTION

Figure 1:
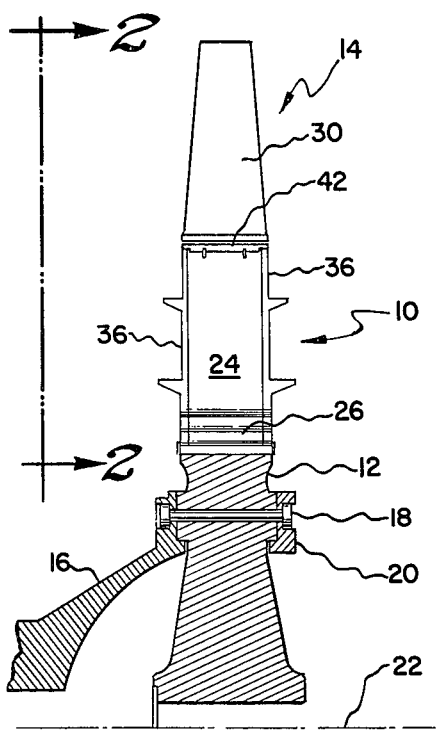
FIG. 1 is an axial half cross-sectional view of a turbine assembly for a gas turbine.

With reference now to FIG. 1, a turbine assembly has been shown at 10 as including an annular wheel 12 having a plurality of buckets 14 secured thereto in an annular array and extending generally radially therefrom. The wheel 12 is secured to a shaft 16 by suitable means such as bolts 18 and an annular bolt ring 20 and is adapted for rotation about a turbine axis 22. As used herein the terms "axial" and "axially" will mean the general direction of the turbine axis 22.

As best shown in FIG. 2, each bucket 14 includes an elongated shank portion 24 which extends generally radially between a root or base portion 26 and a platform portion 28. A blade or vane portion 30 extends generally radially from the platform portion 28.

The wheel 12 may be formed at its periphery with a plurality of generally axially extending dovetail slots 32 which are sized and formed to receive a complimentary dovetail formed on the root or base portion 26 of each bucket 14. In this manner each bucket 14 may be secured to the wheel against the urging of centrifugal force.

The platform portions 28 are sized and formed so as to extend circumferentially into close spaced or abutting relationship with each circumferentially adjacent bucket platform 28 so as to collectively define an annular inner flow boundary for a motive fluid steam that moves across the bucket vane portions 30. As will be understood, the bucket vane portions 30 are adapted to extract energy from the motive fluid stream and impart rotation to the turbine 10 about axis 22.

With reference now to FIG. 2, it will be noted that the bucket shank portions 24 are elongated and define axially extending openings or passageways 34 between each pair of circumferentially adjacent buckets 14. A plurality of coverplates 36 are provided on each axial side of the wheel 12 to close or block fluid flow leakage in the axial direction between the adjacent bucket shank portions 24 or through passages 34. The coverplates 36 are suitably secured adjacent their radial inner ends to the wheel 12 and extend radially into close spaced relationship with the bucket platforms 28 so as to collectively form a generally closed annular plate extending between the wheel 12 and the platforms 28 on each axial side of the wheel 12. Each coverplate 36 may be formed so as to overlap at its radial edges with each immediately adjacent coverplate 36 so as to improve the fluid blocking characteristics of the assembly.

To further enhance the sealing or fluid flow blocking characteristics of the coverplate assembly, the bucket platform portions 28 may be formed with radially inwardly facing, circumferentially extending grooves 38 which are sized and arranged to receive the outer radial end 40 of the coverplates 36 in loose fitting engagement.

A sealing and damping pin 42 extends generally axially between each pair of circumferentially adjacent buckets 14, and is supported by suitable means in a position under and along the interface between adjacent bucket platform portions 28. Each pin 42 is preferably circular in cross-section and the support means has been shown as including a notch 44 formed at each end of the pin 42 so as to define semi or partially circular extensions 46 from each end of the pin which loosely engage support openings 48. The support openings 48 are cooperatively formed by the platforms 28 and the coverplates 36. The portion of each platform 28 which defines the pin support opening 48 is preferably chamfered as at 50 so as to define a generally V-shaped, radially inwardly facing groove 51 along the interface of each pair of adjacent bucket platforms 28.

Each coverplate may be conveniently secured to the wheel 12 against the urging of centrifugal force by engagement of a dovetail portion 39 with the wheel dovetail slot 32.

While the turbine assembly depicted in the drawings employs two coverplates (one on each axial side of the wheel 12) for each bucket 14, and while such an arrangement is the preferred form, it should be understood that a greater or smaller number of coverplates could be used, but in such alternative arrangements each coverplate would of course have to cover, respectively, a smaller or larger sector.

Figure 3:
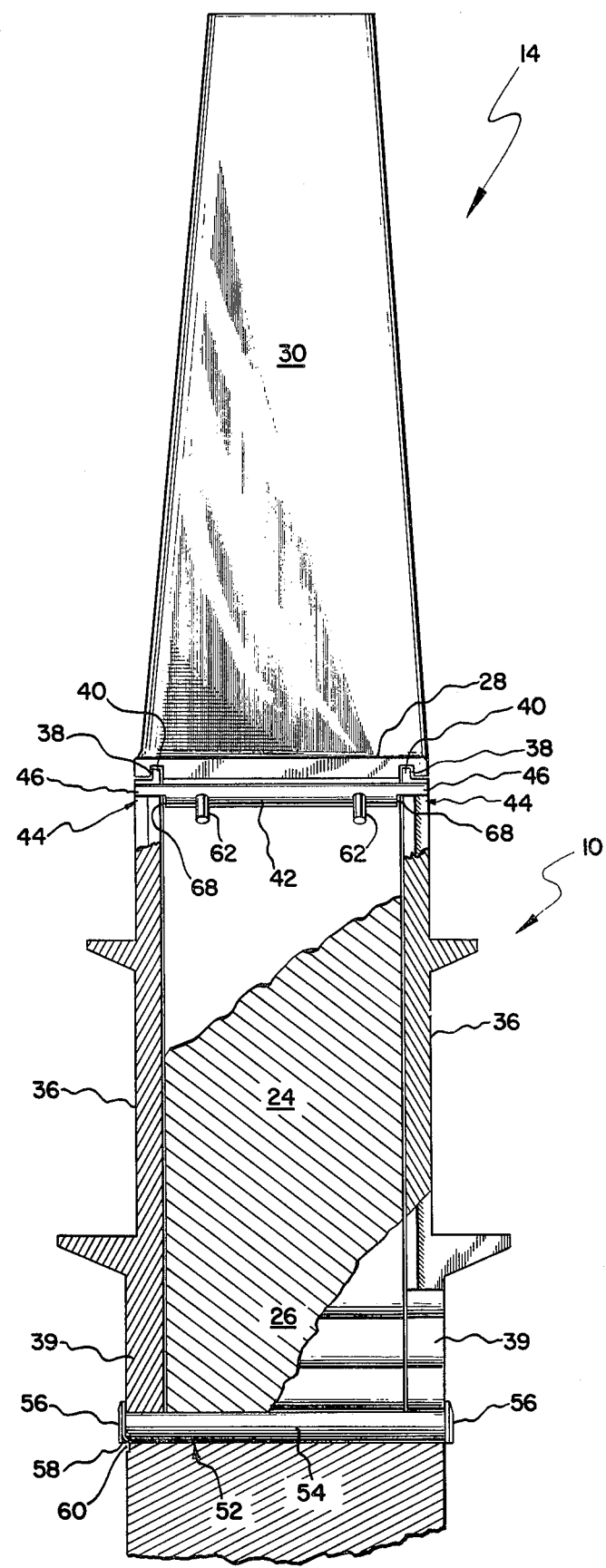
FIG. 3 is a cross-sectional view taken along lines 303 of FIG. 2.

With reference to FIG. 3, suitable means 52 may be provided to axially retain each bucket 14 and pair of associated coverplates 36 within their respective dovetail slot 32. Such means may take a variety of forms. One such arrangement has been shown in FIG. 3 as including a generally cylindrical main body portion 54 formed with a head 56 at each end. The heads 56 extend at right angles from the main body portion 54 and are generally circular in shape with one side cut off generally flush with the main body portion. The head 56 is sized so as to extend over both the dovetail portion of the coverplate 36 and the adjacent portion of the wheel 12 when in the position of FIG. 3. With such an arrangement, the retaining means 52 may be inserted into the dovetail slot 32 with the heads 56 extending radially inwardly (rotated 180° from the position of FIG. 3). The coverplates 36 and bucket 14 may then be inserted into the dovetail slot 32 and the retaining means 52 rotated 180° to its locking position of FIG. 3. To prevent the locking means 52 from rotating out of the locked position of FIG. 3, the corners of each head 56 may be bent as at 58 into an axially facing annular groove 60 formed in the wheel 12.

Each sealing and damping pin 42 is formed with at least one eccentric mass 62, the center of gravity of which is displaced from the centerline of the pin 42 and disposed so that as the wheel 12 is rotated, a centrifugal moment "M" will be generated that will cause the pin 42 to rotate about its axial centerline into frictional abutment, as at 64, with the coverplate 36. Each pin 42 is carried by support openings 48 in general axial alignment with and radially inwardly of the groove 51 or interface between adjacent blade platforms so that wheel rotation will cause each pin 42 to move radially outwardly under the urging of centrifugal force into fluid blocking abutment with the chamfered surfaces 50 of its adjacent bucket platforms 28.

Each pin extension includes an axially extending generally flat portion 66 which terminates at a radially extending pin end surface 68. As will be understood, the end surfaces 68 are spaced so that they will abut the inwardly facing surfaces of their supporting coverplates 36 and prevent the pin 42 from sliding axially out of its position of FIG. 4 where the pin extensions 46 are engaged in the support openings 48. The portion of the support opening 48 which is defined by the coverplate 36 may comprise a stepped-down portion or surface 70 of the radially outer edge of the coverplate 36.

As shown in FIGS. 3 and 4, the pin 42 is installed in the turbine assembly 10 with the generally flat portion or surface 66 of the pin extension 46 facing the generally flat stepped-down edge portion 70 of the coverplate 36.

As will be appreciated, the radial height "h" of the support opening 48 is sized smaller than the diametral width "w" of the pin extension 46 so as to ensure that abutment, as at 64, will occur as the pin 42 rotates about its axis in response to the urging of centrifugal force.

The eccentric mass 62 may take a variety of forms. It may, for example, be formed by one or more projections from the pin 42 which may be cylindrical as in FIG. 4, rectangular as in FIG. 5, or any other convenient shape. The projections may also be formed integrally with the pin 42, as by casting or forging or may be separately formed and secured to the pin 42 by way of a press fit, welding or other suitable means.

The force of abutment between the pin 42 and the coverplate 36 and hence the degree of damping provided to the coverplate 36 for a given wheel rotational speed will vary with the weight of the eccentric mass or masses 62, the distance of the center of gravity 72 of such eccentric mass from the axial centerline of pin 42, and the dimension "w" of the pin extension. Hence for a given application these parameters may be varied to provide the desired amount of damping.

With reference now to FIG. 5, a further variation of the pin 42 has been shown as including a neck portion or area of reduced cross-section 74 which is formed by a notch 78 between two axially spaced eccentric masses 62. In the case of FIG. 5, the eccentric masses 62 have been shown as being integrally cast rectangular projections. The neck portion 74 is sized, in conjunction with the weight and center of gravity location of the eccentric masses 62 and the properties of the pin material such that the neck portion 74 will twist and thereby permit relative rotation between the generally cylindrical pin portions on each axial side of the neck portion 74. In this manner, abutment should occur at each end of the pin 42, as at 64, even though there is some variation in the dimensional stackup between the coverplates at each axial side of the wheel 12.

In operation, the pins 42 are centrifugally urged radially outwardly into abutment with the platforms 28 of adjacent buckets 14 so as to block any space that may exist at interface of such adjacent bucket platforms. In addition, the centrifugal force acting on the eccentric mass or masses 62 generates a moment "M" about the axial centerline of the pin 42 which rotates the pin about its centerline until at least one projecting end 46 of the pin abuts and exerts a force on the stepped-down outer edge portion 70 of a coverplate 36, as at 64. The force of abutment on the coverplates will be sufficient to balance the moment "M" generated by eccentric mass 62. As previously mentioned, the outer radial ends of the coverplates 36 extend into close relationship with the platforms 28 but are not tightly restrained thereby and are hence free to vibrate. With the arrangement of the present invention, however, such vibration would cause heat producing relative slip between the pin 42 and the surface 70. In this manner, the coverplate vibrational energy would be dissipated in part or damped through the mechanism of heat producing relative slip between pin 42 and its particular coverplates. It should also be noted that the force of abutment between the pin and the coverplate may be sufficiently great to actually hold the outer end of the coverplate against vibration in some fundamental modes. In this case, there will not be relative slip between the pin and the coverplate and the outer end of the coverplate will be restrained from movement. To provide a higher probability of frictional abutment of both pin end projections 46 with the coverplates 36 at each axial side of the wheel 12, the pin may be formed with at least two spaced eccentric masses 62 and an area of reduced cross-section 74 therebetween. With such a construction, if dimensional stackup variations occur between the location of the stepped-down surface 70 of the coverplate on one axial side of the wheel relative to the platform V-groove 51 and the location of the stepped-down surface 70 of the coverplate on the other axial side of the wheel relative to the platform V-groove 51, such that abutment as at 64 takes place first at only one axial end of the pin 42, the moment "M" that is centrifugally produced by the eccentric mass 62 on the end of the pin which is not yet in abutment will be sufficient to twist the pin until such abutment occurs.

While a preferred embodiment of the invention and one alternate construction have been depicted and described, such are intended to be exemplary only and it will be appreciated by those skilled in the art that many substitutions, alterations and changes may be made thereto without departing from the fundamental theme of the invention.

What is claimed is:

1. In a gas turbine including a turbine having a rotateable turbine wheel, a plurality of turbine buckets secured to said turbine wheel and extending radially therefrom in an annular array, each said bucket including a platform portion which is spaced radially outwardly from said wheel and is adapted to form, in conjunction with the other platform portions, an inner boundary for a stream of motive fluid flowing across a vane portion of such bucket, a plurality of coverplates secured to said wheel at each axial side of said wheel and extending into close spaced relationship with said platform portions so as to form a generally closed annular plate extending between said wheel and said platforms on each axial side of said wheel, an annular pin extending generally axially between each pair of circumferentially adjacent buckets and radially inwardly of said bucket platforms, means for supporting each pin adjacent each axial end thereof in a position radially inwardly of and in general alignment with the interface of said pin's respective pair of adjacent bucket platforms whereby when said wheel is rotated said pin will be centrifugally urged into abutment with said platforms in fluid blocking relationship to the interface between said adjacent bucket platforms, the improvement comprising:

each said pin including at least one mass eccentrically disposed relative to the axial centerline of said pin and oriented such that when said wheel is rotated, said eccentric mass will generate a moment about said pin axial centerline, with said support means arranged such that said moment will cause said pin to rotate into frictional abutment with a radially outer end portion of at least one coverplate.

2. The improvement of claim 1 further characterized in that each said pin is rotated into frictioned abutment with a coverplate at each axial end of said pin.

3. The improvement of claim 1 further characterized in that said pin includes at least two axially spaced eccentric masses and is formed with a neck having a reduced area of cross-section therebetween sized to permit one axial end of said pin to twist relative to the other axial end of said pin under the urging of the moment produced by one of said eccentric masses.

4. A pin for use in damping vibration in a turbine assembly, said turbine assembly including a turbine wheel, a plurality of turbine buckets secured to said turbine assembly including a turbine wheel, a plurality of turbine buckets secured to said turbine wheel and extending generally radially therefrom in an annular array, each said bucket having a shank portion extending radially from said turbine wheel to a platform portion, a plurality of coverplates secured to said turbine wheel on each axial side thereof which extend into close spaced relationship with said bucket platform portions and collectively form a segmented annular plate for blocking fluid leakage flow between said bucket shank portions, each said coverplate formed with at least one stepped-down portion at its outer radial edge defining a notch therein which is generally aligned with a circumferential edge of a bucket platform portion and is adapted to form a support opening in cooperation with at least one bucket platform portion, said pin comprising an axially elongated annular portion having semi-annular extensions projecting from the ends thereof, said pin sized in axial length to extend generally axially under said bucket platform portion with each said semi-annular extension projecting into one of said support openings, the diametral width of said semi-annular extensions being sized larger than the radial height of said support opening, and said pin having at least one eccentric mass with a center of gravity displaced from the axial centerline of said elongated annular portion, whereby when said turbine wheel is rotated, said eccentric mass will generate a centrifugal moment about the axial centerline of said elongated annular pin portion and said pin will rotate into frictional abutment with an outer radial edge portion of at least one coverplate.

5. A turbine comprising a rotateable turbine wheel, a plurality of turbine buckets secured to said turbine wheel and extending generally radially therefrom, each said bucket having a base portion for attachment of said bucket to the turbine wheel, a shank portion extending generally radially from said base portion to a platform portion and a vane extending radially outwardly from said platform portion, each said platform portion formed and sized to extend into close spaced relationship with each circumferentially adjacent platform portion so as to define a fluid leakage path therebetween and so as to collectively form a generally streamline inner annular boundary for a flow of hot gasses across the vanes of the buckets, a plurality of coverplates secured to said turbine wheel on each axial side thereof and extending radially outwardly into close spaced relationship with said bucket platform portions, said coverplates formed and disposed so as to collectively form a segmented annular plate on each axial side of said wheel for reducing fluid leakage in the axial direction between adjacent bucket shank portions, an elongated annular pin extending generally axially between each pair of circumferentially adjacent turbine buckets along and under the interface between the platform portions of such buckets, each said pin being notched at each axial end thereof so as to define semi-annular extensions at each end of the pin, each said pin being loosely supported in position when said wheel is stationary by engagement of its semi-annular extension with a support opening defined by said coverplates and said bucket platforms, each said pin having at least one eccentric mass with a center of gravity displaced from the axial centerline of said pin, said support oenings having a radial height which is less than the diameter of said pins, whereby each said pin will be centrifugally rotated about its axis by said eccentric mass and urged into abutment with said platform and said coverplates.

* * * * *

UNITED STATES PATENT AND TRADEMARK OFFICE
CERTIFICATE OF CORRECTION

PATENT NO. : 4,088,421
DATED : May 9, 1978
INVENTOR(S) : Robert F. Hoeft

It is certified that error appears in the above-identified patent and that said Letters Patent are hereby corrected as shown below:

In Column 6, Lines 39 and 40, delete "a plurality of turbine buckets secured to said turbine assembly including a turbine wheel,"

Signed and Sealed this

Twenty-fourth Day of July 1979

[SEAL]

Attest:

Attesting Officer

LUTRELLE F. PARKER
Acting Commissioner of Patents and Trademarks